United States Patent
Knoerzer (12)

(10) Patent No.: US 12,017,830 B2
(45) Date of Patent: Jun. 25, 2024

(54) COMPOSITION FOR A BIODEGRADABLE FILM AND PACKAGE

(71) Applicant: Anthony Robert Knoerzer, Florissant, CO (US)

(72) Inventor: Anthony Robert Knoerzer, Florissant, CO (US)

(*) Notice: Subject to any disclaimer, the term of this patent is extended or adjusted under 35 U.S.C. 154(b) by 0 days.

(21) Appl. No.: 17/667,477

(22) Filed: Feb. 8, 2022

(65) Prior Publication Data

US 2022/0250819 A1 Aug. 11, 2022

Related U.S. Application Data

(60) Provisional application No. 63/300,862, filed on Jan. 19, 2022, provisional application No. 63/147,095, filed on Feb. 8, 2021.

(51) Int. Cl.
| | |
|---|---|
| *B65D 65/46* | (2006.01) |
| *B65D 65/42* | (2006.01) |
| *B65D 85/804* | (2006.01) |
| *C23C 24/00* | (2006.01) |

(52) U.S. Cl.
CPC ........ *B65D 65/466* (2013.01); *B65D 65/42* (2013.01); *B65D 85/8043* (2013.01); *C23C 24/00* (2013.01)

(58) Field of Classification Search
None
See application file for complete search history.

(56) References Cited

U.S. PATENT DOCUMENTS

| | | | | |
|---|---|---|---|---|
| 4,956,242 A | * | 9/1990 | Shimizu | ........ C21D 8/0436 428/606 |
| 5,322,866 A | * | 6/1994 | Mayer | ............ C08L 29/04 524/451 |
| 2001/0031348 A1 | * | 10/2001 | Jud | ............. B32B 27/32 428/35.8 |

(Continued)

FOREIGN PATENT DOCUMENTS

| | | | |
|---|---|---|---|
| CN | 108091779 A | * | 5/2018 |
| WO | 2016054528 A2 | | 4/2016 |
| WO | 2020206042 A1 | | 10/2020 |

OTHER PUBLICATIONS

Kyulavska, M., Toncheva-Moncheva, N., Rydz, J. (2019), Biobased Polyamide Ecomaterials and Their Susceptibility to Biodegradation. In: Martinez, L., Kharissova, O., Kharisov, B. (eds) Handbook of Ecomaterials, Springer (Year: 2019).*

(Continued)

*Primary Examiner* — Lee E Sanderson
(74) *Attorney, Agent, or Firm* — Jorge Miguel Hernandez; James R. Gourley; Carstens, Allen & Gourley, LLP

(57) ABSTRACT

A biodegradable composite comprising an oxidizing metal barrier layer, a bio-based outer print layer attached to a top surface of the oxidizing metal barrier layer, and a bio-polymer inner layer attached to a bottom surface of the oxidizing metal barrier layer. In another aspect, a method for making a biodegradable composite comprising the steps of applying a bio-based outer print layer to a top surface of an oxidizing metal barrier layer, and applying a bio-polymer inner layer to a bottom surface of the oxidizing metal barrier layer. In another aspect, a biodegradable or compostable single-serving coffee pod is provided.

4 Claims, 2 Drawing Sheets

(56) References Cited

U.S. PATENT DOCUMENTS

| | | | |
|---|---|---|---|
| 2005/0079322 A1* | 4/2005 | Knoerzer | B32B 37/153 |
| | | | 428/136 |
| 2008/0044650 A1 | 2/2008 | Sukigara et al. | |
| 2008/0160327 A1 | 7/2008 | Knoerzer et al. | |
| 2009/0094945 A1* | 4/2009 | Nakagawa | B65B 61/025 |
| | | | 53/451 |
| 2011/0200796 A1 | 8/2011 | Knoerzer et al. | |
| 2012/0177859 A1 | 7/2012 | Gavel et al. | |
| 2013/0224446 A1* | 8/2013 | Fayne | C09J 7/29 |
| | | | 428/209 |
| 2015/0118435 A1* | 4/2015 | Kimura | E04B 1/803 |
| | | | 156/60 |

OTHER PUBLICATIONS

Rana et al., Recent developments in microbial degradation of polypropylene: Integrated approaches towards a sustainable environment, Science of the total environment, Elsevier, vol. 826. (Year: 2022).*

* cited by examiner

COMPOSITION FOR A BIODEGRADABLE FILM AND PACKAGE

CROSS REFERENCE TO RELATED APPLICATIONS

This application claims the benefit of U.S. Provisional Application No. 63/147,095, filed Feb. 8, 2021, entitled "Composition for a Biodegradable Film," and U.S. Provisional Application No. 63/300,862, filed Jan. 19, 2022, entitled "Composition for a Biodegradable Film and Package," the disclosures of which are hereby incorporated by reference in their entireties.

BACKGROUND

Technical Field

The present invention relates to a biodegradable composite film that can be used in food product, a method of making a biodegradable composite, and food packages made therefrom.

Description of Related Art

Multi-layered film structures made from petroleum-based products originating from fossil fuels are often used in flexible packages where there is a need for its advantageous barrier, sealant, and graphics properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package. The sealant properties are important in order to enable the flexible package to form an airtight or hermetic seal. Without a hermetic seal, any barrier properties provided by the film are ineffective against oxygen, moisture, or aroma transmission between the product in the package and the outside. Currently, non-biodegradable petroleum-based polymers such as polyethylene and its modified forms are typically used to provide a hermetic seal between the inside of the package and the outside of the package. Also, metal layers such as aluminum oxide or silicon oxide are used to provide oxygen and moisture barrier properties in the film. However, a disadvantage of using these types of metals is that they are not biodegradable in that they do not quickly break down in the environment after being used and discarded. Therefore, a need exists for a biodegradable composite that provides sufficient barrier and sealant properties.

SUMMARY

In one embodiment, a biodegradable composite film is disclosed. It is understood that the term "biodegradable" when used in reference to a packaging film, composite, or package, includes those that are "compostable" as a subgenus. Thus, any film, composite, or package described as biodegradable could also be described as compostable.

In one embodiment, a biodegradable composite film comprises an oxidizing metal barrier layer, a bio-based outer print layer attached to a top surface of the oxidizing metal barrier layer, and a bio-polymer inner layer attached to a bottom surface of the oxidizing metal barrier layer.

According to some embodiments, the bio-based outer print layer comprises a bio-polymer or PCR paper. In one embodiment, the bio-polymer inner layer comprises PLA or PHA. In another embodiment, the biodegradable composite file comprises a primer layer between the oxidizing metal layer and the bio-based inner layer. In other embodiments, the primer may include an epoxy, polyethylenimine, maleic anhydride, ethylene methacrylate, and ethylene-vinyl acetate. In another embodiment, the biodegradable composite film comprises a first adhesion layer and a second adhesion layer. The first adhesion layer is between the bio-based outer print layer and the oxidizing metal barrier layer, and the second adhesion layer is between the bio-based inner layer and the oxidizing metal. In another embodiment, the first adhesion layer has a higher peel strength than the second adhesion layer.

According to some embodiments, the biodegradable composite film comprises a primer layer between the oxidizing metal barrier layer and the bio-based inner layer. The primer may include an epoxy, polyethylenimine, maleic anhydride, ethylene methacrylate, and ethylene-vinyl acetate. In another embodiment, the oxidizing metal barrier layer is a carbon steel foil. The carbon steel foil may have an oxidation rate matched to the bio-based outer print layer and bio-based inner layer.

In another embodiment, a package made using the biodegradable composite film disclosed or claimed herein is provided.

In another embodiment, a method for making a biodegradable composite is provided. The method includes, but is not limited to, the steps of applying a bio-based outer print layer to a top surface of an oxidizing metal barrier layer, and applying a bio-based inner layer to a bottom surface of the oxidizing metal barrier layer.

According to some embodiments, the method may include before the step of applying the bio-based inner layer, applying a primer to the bottom surface of the oxidizing metal barrier layer, and applying an adhesive layer to the bottom surface of the oxidizing metal barrier layer. In other embodiments, the method may include before the step of applying the bio-based inner layer, applying a first adhesive layer to the bottom surface of the oxidizing metal barrier layer and before the step of applying the bio-based outer print layer, applying a second adhesive layer to the top surface of the oxidizing metal barrier layer. In another embodiment, the method may include before the step of applying the bio-based inner layer, applying a primer to the bottom surface of the oxidizing metal barrier layer and applying an adhesive layer to the bottom surface of the oxidizing metal barrier layer. In other embodiments, the method may include powder coating the oxidizing metal barrier layer with the bio-based inner layer.

In another embodiment, a compostable single-serving coffee pod is provided. The compostable single-serving coffee pod may comprise a body having a first end and a second end. The lid may be coupled to the first end of the body. The body may include an oxidizing metal barrier layer. In another embodiment, the oxidizing metal barrier layer is a carbon steel foil. In other embodiments, the compostable single-serving coffee pod comprises an outer biopolymer layer attached to the top surface of the body. In another embodiment, the compostable single-serving coffee pod comprises an inner biopolymer layer attached to the bottom surface of the body. In yet another embodiment, the lid may comprise an oxidizing metal barrier layer.

According to some embodiments, the compostable single-serving coffee pod may comprise a first adhesion layer between the outer biopolymer layer and the top surface of the body, and a second adhesion layer is between the inner biopolymer layer and the bottom surface of the body. The oxidizing metal barrier may have an oxidation rate matched to the inner biopolymer layer and the outer biopolymer layer. In other embodiments, the compostable single-serving coffee pod may comprise a first primer between the outer biopolymer layer and the top surface of the body, and a second primer between the inner biopolymer layer and the bottom surface of the body. The first primer and the second primer may comprise an epoxy, polyethylenimine, maleic anhydride, ethylene methacrylate, and ethylene-vinyl acetate.

BRIEF DESCRIPTION OF THE FIGURES

The foregoing aspects and many of the attendant advantages, of the present technology will become more readily appreciated by reference to the following Detailed Description, when taken in conjunction with the accompanying simplified drawings of exemplary embodiments. The drawings, briefly described here below, are presented for ease of explanation and do not limit the scope of the claimed subject matter.

DETAILED DESCRIPTION

The following non-limiting detailed descriptions of examples of embodiments may refer to appended Figure drawings and are not limited to the drawings, which are merely presented for enhancing explanations of features of the technology.

Figure 1:
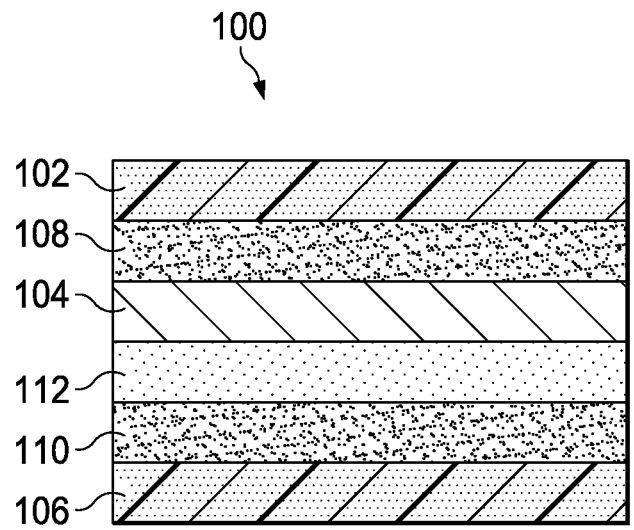
FIG. 1 depicts an embodiment of a magnified schematic cross-section of a biodegradable packaging composite film.

FIG. 1 depicts an exemplary embodiment of a magnified schematic cross-section of a biodegradable composite 100. The biodegradable composite 100 comprises a bio-based outer print layer 102 attached to a top surface of an oxidizing metal barrier layer 104. The bio-based outer print layer 102 may comprise a bio-based polymer or a paper layer, which may comprise post-consumer reclaim ("PCR") fibers. As used herein, the term "PCR fibers" refers to fibers that are made from recycled paper. As used herein, the term "PCR paper" refers to paper made from a cellulose-based material that comprises PCR fibers. Any reference in this specification to PCR paper is intended to encompass "food safe PCR paper."

In one embodiment, the outer print layer 102 comprises PCR paper which further comprises between about 5% and about 100% PCR fiber by weight of the outer print layer 102. PCR paper fibers can be added to virgin paper fibers (if any) during typical and conventional paper making processes during the wet mixing stage. The PCR fibers or PCR and virgin fibers (if present) are dried across a drum roll to form the paper sheet. The PCR fibers thereby replace a portion or all of the virgin fibers. Further, in one embodiment, the biodegradable composite 100 comprises between about 1.25% and about 70% PCR fibers by total weight of the biodegradable composite 100.

Unlike plastic sheets of film where the thickness of the film is measured in "gauge", the thickness of paper is usually measured in pounds per ream, which is the weight of 432,000 square inches of film. In one embodiment, the bio-based outer print layer 102 comprises between about 15 pounds and about 30 pounds per ream. In one embodiment, the PCR paper comprises between about 25% and about 70% and more preferably about 50% by weight of the biodegradable composite 100.

With continued reference to FIG. 1, the biodegradable composite 100 further comprises a bio-polymer inner layer 106 attached to a bottom surface of the oxidizing metal barrier layer 104. These three layers (102, 104, 106) may be used as a biodegradable composite 100 that has acceptable barrier properties.

As used herein, an oxidizing metal barrier layer 104 is a metal layer that will oxidize (or rust) under typical refuse environmental conditions or composting conditions, depending on the intended life cycle of the package. Examples of an oxidizing metal barrier layer that can be used in accordance with the present invention is a non-stainless carbon steel layer, which may or may not be further modified by additional metals that modify the metallurgical properties of the steel layer. Such further metals may include one or more of the following: chromium, cobalt, copper, molybdenum, nickel, niobium, selenium, titanium, tungsten, vanadium, zirconium. In contrast to stainless steel, which typically contains chromium, nickel, molybdenum, and/or other elements at specific minimum levels to provide rusting and corrosion resistance, the non-stainless steel used in connection with the present invention may contain some of the same elements, but at lower percentages than stainless steel. In this way, the oxidizing metal layer will still break down in the environment or compost, but at different rates depending on the metal modifications chosen according to the intended life cycle for the package made using the composite described herein.

Use of a non-stainless steel barrier layer in accordance with the present invention provides several advantages over the prior art. Steel is malleable enough to be formed into thin foil that can be used as a laminate layer along with other biodegradable layers to form a packaging film composite. Unlike metals such as aluminum foil (which is commonly used in the packaging film industry as a barrier layer) or stainless steel foil, the steel used in accordance with the present invention will also oxidize or rust when exposed to the oxygen and moisture present in the environment or under compost conditions. Steel is also food-safe, which is a requirement for materials used in food packaging. In at least one embodiment, the non-stainless steel barrier layer comprises an oxidation rate matched to the bio-based outer print layer 102 and/or bio-polymer inner layer 106.

As used herein, a biodegradable composite 100 with acceptable barrier properties has both acceptable oxygen barrier properties and acceptable moisture barrier properties. As used herein, a biodegradable composite 100 having acceptable oxygen barrier properties has an oxygen transmission rate of less than 150 cc/m$^2$/day (ASTM D-3985). As used herein, a biodegradable composite 100 having acceptable moisture barrier properties comprises a water vapor transmission rate of less than 5 grams/m$^2$/day (ASTM F-1249).

As used herein, the term "bio-polymer" means a polymer where at least 80% of the polymer by weight is derived from a non-petroleum feedstock. In one embodiment, up to 20% of the bio-polymer can comprise a conventional polymer sourced from petroleum. Non-limiting examples of bio-polymers include polylactic acid ("PLA") and polyhydroxyalkanoate ("PHA").

PLA can be made from plant-based feedstocks including soybeans, as illustrated by U.S. Patent Application Publication Number 2004/0229327 or from the fermentation of agricultural by-products such as corn starch or other plant-based feedstocks such as corn, wheat, or sugar beets. PLA can be processed like most thermoplastic polymers into a film. PLA has physical properties similar to PET and has excellent clarity. PLA films are described in U.S. Pat. No. 6,207,792 and PLA resins are available, for example, from Natureworks LLC (http://www.natureworksllc.com) of Minnetonka, Minnesota PLA degrades into carbon dioxide and biomass. PLA films used in accordance with the present invention are substantially insoluble in water under ambient conditions.

PHA is available from, for example, Archer Daniels Midland of Decatur, Illinois PHA is a polymer belonging to the polyesters class and can be produced by microorganisms (e.g. *Alcaligenes eutrophus*) as a form of energy storage. In one embodiment, microbial biosynthesis of PHA starts with the condensation of two molecules of acetyl-CoA to give acetoacetyl-CoA which is subsequently reduced to hydroxy-butyryl-CoA. Hydroxybutyryl-CoA is then used as a monomer to polymerize PHB, the most common type of PHA.

The biodegradable composite 100 may further comprise a first adhesion layer 108 that attaches the bio-based outer print layer 102 to the oxidizing metal barrier layer 104. Additionally, the biodegradable composite 100 may further comprise a second adhesion layer 110. In one embodiment, any polymer or polymer blend that processes similar to the bio-polymer on an orientation line, that has a relatively smooth surface (such as provided by an amorphous PET v. a crystalline PET, described in more detail below) and that has polar chemical groups, can be used as a suitable adhesion layer 108. Polar chemical groups are desirable in the adhesion layer 108 because they are attracted to the oxidizing metal barrier layer 104, and it is believed that polar chemical groups such as hydroxyl groups covalently bond to form a metal oxide. Consequently, alcohol blends using an ethylene vinyl alcohol ("EVOH") formula and polyvinyl alcohol ("PVOH") are desirable, as are polymers having polar amide groups such as nylon. Further, amorphous PET and polyglycolic acid ("PGA") having polar carbonyl groups can also be used. Consequently, in one embodiment, an adhesion layer 108 comprises one or more polar films selected from amorphous or glassy PET, PGA, various nylons including amorphous nylon, EVOH, nylon/EVOH blends, PVOH, PVOH/ethylene acrylic acid (hereinafter "EAA") blends, epoxy-based adhesives, urethanes, and a primer.

In another embodiment, the adhesion layer 108 may be used to "glue" the outer print layer 102 to the oxidizing metal barrier layer 104 with either conventional extrusion lamination (using molten polyethylene or similar material) or adhesive lamination (either solvent or solvent-less).

With continued reference to FIG. 1, the biodegradable composite 100 may further comprise a primer 112 that is coated on the top surface and/or bottom surface of the oxidizing metal barrier layer 104. A primer layer might be used when the material chosen for the adhesion layer adheres well to the outer print layer 102 or the inner layer 106, but does not adhere well to the oxidizing metal layer 104. In this case, the primer layer adheres well to the oxidizing metal barrier layer and to the adhesion layer. It may also be desirable to shield the material used in the primer layer from the interior of the package by use of a separate adhesion layer between the primer layer and the inner layer of the film. In some embodiments this could inhibit migration of materials used for the primer layer to the interior of the package. Examples of suitable primers that can be used in accordance with various embodiments of the present invention include, but are not limited to, an epoxy (which adheres well to most other materials, including metals and other adhesives), maleic anhydride, ethylenemethacrylate ("EMA"), and ethylenevinylacetate ("EVA"). Other suitable primers include polyethylenimine and OXY-BLOCK coatings available from Akzo Nobel packaging coatings and OPADRY available from Colorcon of Harleysville, PA.

Additives can also be used to facilitate the attachment of the oxidizing metal barrier layer 104 to the adhesion layers 108, 110 or to facilitate application of the oxidizing metal barrier layer 104 to the bio-polymer inner layer 106. As used herein, the term "additives" is not limited to chemical additives and can include surface treatment including, but not limited to, corona treatment. In one embodiment, use of the adhesion layers 108, 110 makes it possible to provide an oxidizing metal barrier layer 104 with no additives.

The biodegradable composite film of the present invention is preferably used to make packages intended to contain food or other products that can degrade when exposed to oxygen or moisture from the air. The composite film is structured such that it can be run through known horizontal form fill seal (HFFS) machines and vertical form fill seal (VFFS) machines that are commonly used in the food packaging industry. The composite film can also be used to form pre-made bags that are filled with product after they are made, or in flow wrapping machine applications.

Figure 2:
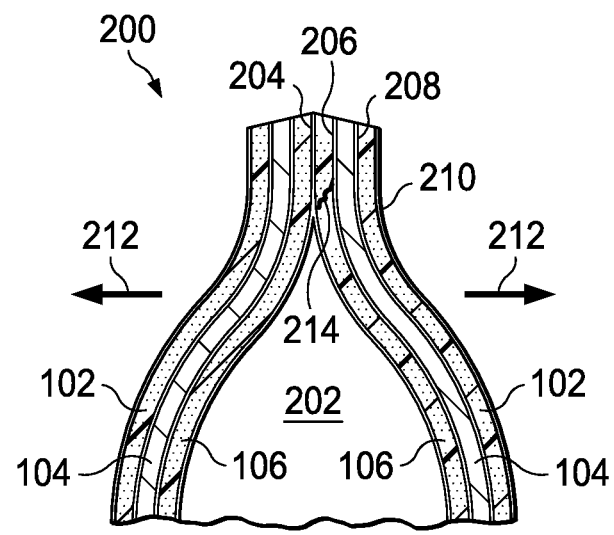
FIG. 2 depicts a zoomed in cross sectional view of a top portion of a pillow-type package constructed using one embodiment of the biodegradable composite packaging film of the present invention.

FIG. 2 depicts an idealized zoomed-in cross section of the upper portion of a pillow-type bag 200 made using one embodiment of the inventive film described herein. The pillow-type bag 200 may have writing or graphics printed on the outside surface 210 of outer print layer 102. FIG. 2 illustrates an embodiment of how the film can be structured to provide a frangible seal that allows the oxidizing metal barrier layer to be exposed to the air when the package is opened. Typically, when a pillow-type bag is manufactured, the inner bio-polymer layer 106 is adhered to itself under heat and pressure at hermetic seal 204. Hermetic seal 204 will require a certain amount of force, or peel strength, to separate the two inner bio-polymer layers 106 from one another. In one embodiment of the present invention, the seal between the inner bio-polymer layer 106 and the oxidizing metal layer 104 has a peel strength that is lower than the peel strength of the hermetic seal 204. When a pillow-type bag of this configuration is opened to allow access to the interior of the package 202 by pulling on opposite sides of the bag in the direction of arrows 212, the difference in peel strength causes a tear 214 through inner bio-polymer layer 106 to form, and the package separates at seal 206 rather than hermetic seal 204. In another embodiment, the seal 208 between the outer print layer 102 and the oxidizing metal layer 104 also has a higher peel strength than seal 206. The end result is that the portion of the oxidizing metal layer above the tear 214 will be exposed to the atmosphere, thereby facilitating degradation of the metal layer in the environment or under compost conditions.

In another embodiment, the adhesion layer and/or primer used to attach the bio-polymer inner layer to the oxidizing metal layer is a moisture sensitive adhesive, such as acrylic or PVOH. A moisture sensitive adhesive will degrade faster when the discarded package is exposed to wet environmental or compost conditions, which would further facilitate efficient degradation of the entire biodegradable packaging structure.

FIG. 2 does not specifically depict any adhesion layer or primer layer, but one skilled in the art understands that an adhesion and/or primer layer can be used to create seals 206 and 208 on either side of the oxidizing metal layer 104.

There are several different example method steps that can be used to make a biodegradable composite in accordance with different embodiments of the present invention. In one embodiment, a roll of cast or oriented bio-based polymer sheet, or a paper sheet, is laminated onto a top surface of an oxidizing metal barrier layer, such as a roll of non-stainless-steel foil, to create the outer print layer. The bio-based polymer or paper sheet is unrolled at the same time as the non-stainless-steel foil is unrolled, and the sheets are pressure-laminated together. Preferably, an adhesive is used as described herein to attach the outer print layer to the oxidizing metal barrier layer. Optionally, the top surface of the oxidizing metal barrier layer can be primed with a primer, as described herein, before the outer print layer is laminated to the oxidizing metal barrier layer. In another embodiment, a bio-polymer can be extrusion coated onto a primed surface of the oxidizing metal barrier layer, such as a non-stainless-steel foil.

Similar processes can be used to attach the bio-polymer inner layer to the oxidizing metal barrier layer. In one embodiment, the bio-polymer inner layer is applied by extrusion coating the bio-polymer inner layer onto a primed surface of the oxidizing metal barrier layer. In another embodiment, the bio-polymer inner layer is applied by applying priming the bottom surface of the oxidizing metal barrier layer, applying an adhesive over the primer layer, and extrusion coating the bio-polymer inner layer to the bottom surface of the oxidizing metal barrier layer. In still another embodiment, the bio-polymer inner layer laminated onto the bottom surface of the oxidizing metal barrier layer using an adhesive, as described herein. Such a lamination may occur before, after, or at the same time as the outer print layer is laminated onto the oxidizing metal barrier layer. In still another embodiment, the bio-polymer inner layer is applied by powder coating the bottom surface of the oxidizing metal barrier layer with the bio-polymer inner layer, and then curing the powder coat with heat or ultraviolet light.

As used herein, primer may comprise epoxy, polyethylenimine, maleic anhydride, ethylene methacrylate, ethylene-vinyl acetate, acrylic, styrenic, or any mixture thereof. As used herein, adhesive or adhesion layer may comprise PET, PGA, various nylons including amorphous nylon, EVOH, nylon/EVOH blends, PVOH, PVOH/ethylene acrylic acid (hereinafter "EAA") blends, epoxy, and any mixture thereof.

One industry that particularly benefits from the application of embodiments of the technology described and claimed herein is the single-serve coffee industry. Single-serving coffee machines generally use a 'pod' that contains coffee and may also contain a filter or other internal components designed to modify the flow of water through the pod. The consumer places a pod in the machine and secures the lid. After the lid is secured, the machine heats the water, punctures hole(s) in the top of the pod, and injects the hot water at moderate temperature into the pod. Generally, the water is injected into the pod through a series of holes around the perimeter and exits via a central hole. The flow is controlled by the pressure gradient. Upon exiting, the coffee is sent down to a waiting cup. When the consumer opens the lid, the pod can be removed and is disposed.

These single-serving coffee pods have the potential to generate large amounts of waste. An empty, unused pod that makes one cup of coffee (~7 oz) generally weighs about 14.5 g. Such a pod may contain approximately 12 g of coffee and the packaging for the pod may weight approximately 2.5 g. The pod packaging typically comprises an aluminum or aluminized lid and a base. The lidding material may be, for example, a metallized polymer so that the metal layer of the lid provides some moisture barrier properties and the polymer gives tear resistance when the lid is punctured by the device. The base (or body) may also include an aluminum layer. The aluminum layers used to make the pod may be nominally 0.125 mm thick. The shape of the pod may be a semi-sphere or cup, with polymer lidstock creating a closure across the upper lip of a round base.

Given the amount of aluminum used for a typical single pod, a coffee drinker who consumes two cups a day may generate about 4 lbs of aluminum waste per year—about the equivalent of 125 soda cans.

The aluminum-based pods may be appropriately coated on both the inside and outside to provide product protection and identification. The coatings can be either polymeric or solution-applied, and many coatings used in the food industry are BPA-free.

The challenge in this industry is that the pods are difficult to recycle. They are not compatible with existing recycle streams unless the consumer empties the coffee from the pod. This may require using a knife to cut open the lidding material and dump the contents (used coffee grounds) into the trash or compost bin. This generally defeats the convenience factor sought by the consumer when using a single-serving coffee machine. Further, the lidstock still is thrown in the trash and will likely end up in a landfill.

Figure 3A:
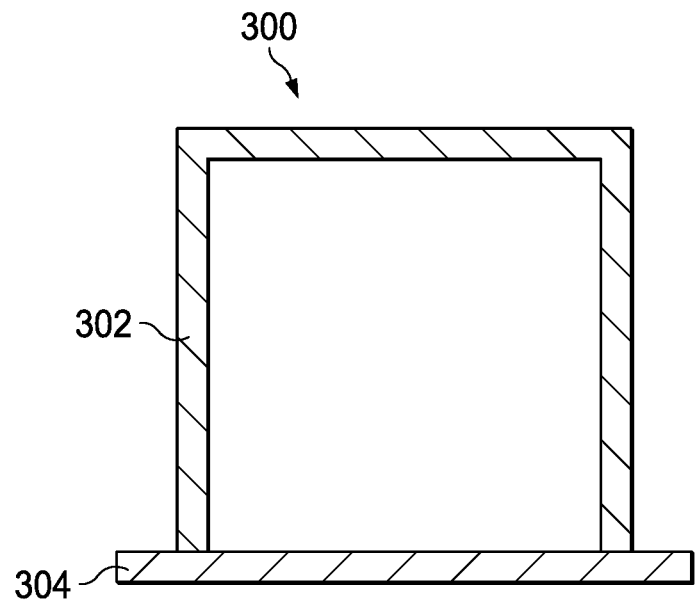
FIG. 3A depicts an embodiment of a compostable single-serving coffee pod.

The applicant herein provides an alternative: use a steel foil, as described herein above, to replace the aluminum in the coffee pod. Referring to FIG. 3A, the steel-based pod 300 can be formed like an aluminum-based pod. Steel provides ample barrier for the application and can be used in the same or similar fashion as the aluminum in existing pods to provide the product protection and the decoration. The lidstock 304 may comprise a steel foil and may be crimped to a steel-based cup to form a functional single-serving coffee pod 300.

One advantage to a coffee pod made using the present invention is that it can go directly in the composting bin. By including a compostable lidstock and/or base, the consumer no longer needs to disassemble the pod 300 to compost it.

As described herein above, the steel is selected from any of the numerous types of steels that will rust. Rusting is natural decomposition that occurs easily when exposed to water and oxygen. The steel used to make the coffee pods 300 can be coated in a manner similar to a steel can (commonly called a tin can) that are often seen rusting in the environment. The coating should be of sufficient durability to survive the intended use period but not so robust as to prevent rusting. Both the inside and outside of the pod can be protected in this manner.

Figure 3B:
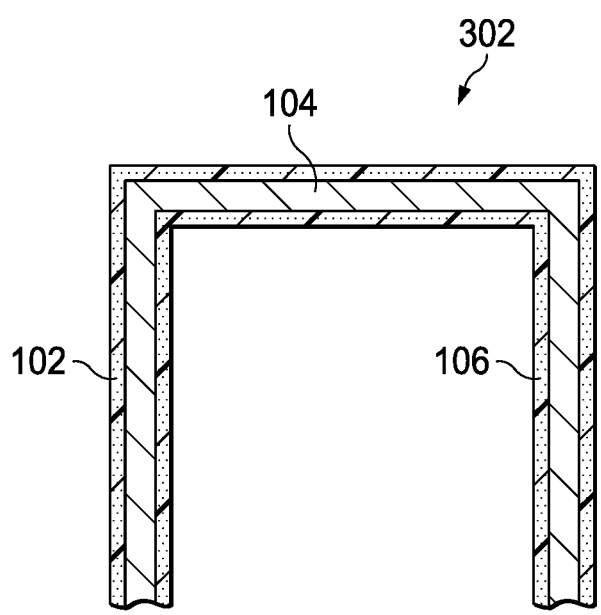
FIG. 3B depicts a cross sectional view of the compostable single-serving coffee pod according to an illustrative embodiment.

Referring to FIG. 3B, a cross-section view depicting an embodiment of the body 302 of the pod 300 is shown. The body 302 may comprise a biodegradable composite. The steel layer 104 can be coated or laminated to a biopolymer layer that will provide appropriate resistance to the hot water. The biopolymer layer may include PLA, PHA, and/or other similar compostable polymer. The steel layer 104 can be coated on one side or both sides in a fashion similar to a can used in a retort application (aka the tin can), or the other side can be coated with a suitable biopolymer. In at least one example, the steep layer 104 can be coated with an outer biopolymer layer 102 and an inner biopolymer layer 106. The outer biopolymer layer 102 and/or an inner biopolymer layer 106 may include product protection and identification. The body 302 and/or lidstock can include any variation or combination of a biodegradable composite 100, as described herein above. Additionally, the pods can be powder coated with suitable materials, including PLA. The lid stock may also be chosen from the numerous biopolymers that are known to decompose, for example, PLA. In all embodiments, the use of a steel grade that will rust allows the consumer to throw the item in a recycle bin (with some preparation) or a compost bin. In one embodiment, the lidstock may comprise an oxidizing metal barrier having an oxidation rate matched to the outer biopolymer layer 102 and/or the inner biopolymer layer 106. In another embodiment, the base may comprise an oxidizing metal barrier having an oxidation rate matched to the outer biopolymer layer 102 and/or the inner biopolymer layer 106. In still another embodiment, the lidstock and base may comprise an oxidizing metal barrier having an oxidation rate matched to the outer biopolymer layer 102 and the inner biopolymer layer 106.

Another industry that benefits from the application of embodiments of the technology described and claimed herein is the coffee packaging industry. As coffee is sensitive to external factors (e.g., oxygen, moisture, light), manufacturers employ materials that are not compatible with existing recycle streams to preserve the coffee. The applicant herein provides an alternative: use a pillow-type bag, as described herein above, to replace the current coffee packages. As discussed above in reference to FIG. 2, the pillow-type bag may comprise a biodegradable composite 100. The pillow-type bag 200 may an outside surface 210 of outer print layer 102. The inner bio-polymer layer 106 may be adhered to itself under heat and pressure at hermetic seal 204. Hermetic seal 204 may require a certain amount of force, or peel strength, to separate the two inner bio-polymer layers 106 from one another. In one embodiment of the present invention, the seal 204 between the inner bio-polymer layer 106 and the oxidizing metal layer 104 has a peel strength that is lower than the peel strength of the hermetic seal 204. When a pillow-type bag of this configuration is opened to allow access to the interior of the package 202 by pulling on opposite sides of the bag in the direction of arrows 212, the difference in peel strength causes a tear 214 through inner bio-polymer layer 106 to form, and the package separates at seal 206 rather than hermetic seal 204. In another embodiment, the seal 208 between the outer print layer 102 and the oxidizing metal layer 104 also has a higher peel strength than seal 206. The end result is that the portion of the oxidizing metal layer above the tear 214 will be exposed to the atmosphere, thereby facilitating degradation of the metal layer in the environment or under compost conditions. In one embodiment, the pillow-type bag 200 is resealable and preserves the properties of the contents within the pillow-type bag 200. The adhesive properties of at least one of the inner bio-polymer layers 106 allows for adhesion after the pillow-type bag 200 is opened while providing the same or substantially same protection from the environmental factors. When the pillow-type bag 200 is ready for disposal, the tear 214 is left open, allowing a portion of the oxidizing metal layer to be exposed to the atmosphere, thereby facilitating degradation of the metal layer in the environment or under compost conditions.

While examples of embodiments of the technology have been presented and described in text, and some examples also by way of illustration, it will be appreciated that various changes and modifications may be made in the described technology without departing from the scope of the claimed subject matter, as properly interpreted and construed.

What is claimed is:

1. A biodegradable composite packaging film comprising:
   a bio-based outer print layer;
   a bio-based inner layer;
   a single oxidizing metal barrier layer between the bio-based outer print layer and the bio-based inner layer, wherein the oxidizing metal barrier layer is a carbon steel foil; and
   a first adhesion layer and a second adhesion layer, wherein:
   the first adhesion layer is between the bio-based outer print layer and the oxidizing metal barrier layer;
   the second adhesion layer is between the bio-based inner layer and the oxidizing metal barrier layer; and
   the first adhesion layer has a higher peel strength than the second adhesion layer.

2. The biodegradable composite film of claim 1, wherein:
   the oxidizing metal barrier layer comprises a top surface and a bottom surface;
   the bio-based outer print layer is attached to the top surface of the oxidizing metal barrier layer; and
   the bio-based inner layer is attached to the bottom surface of the oxidizing metal barrier layer.

3. The biodegradable composite film of claim 1, further comprising a primer layer, wherein:
   the primer layer is between the oxidizing metal layer and the bio-based inner layer; and
   the primer is selected from the group consisting of an epoxy, polyethylenimine, maleic anhydride, ethylene methacrylate, and ethylene-vinyl acetate.

4. A package comprising the biodegradable composite film of claim 1.

* * * * *